3,159,612
EPOXIDIZED POLYAMIDES

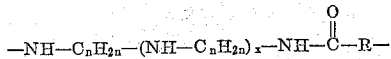

Kwan C. Tsou, Huntingdon Valley, and Elizabeth A. Blommers, Abington, Pa., assignors to The Borden Company, New York, N.Y., a corporation of New Jersey
No Drawing. Filed Feb. 10, 1961, Ser. No. 88,257
7 Claims. (Cl. 260—89.7)

This invention relates to water soluble, thermosetting modified polyamide resins of carboxylic acids having originally an ethenoid bond on an alpha-carbon and the process of making the modified resins.

The invention utilizes, as a starting material, any of the polymerized amides of unsaturated acids disclosed in copending application Serial No. 31,571, filed by one of us, Kwan Chung Tsou, on May 25, 1960, for Polyamide Resins and Process. The copending application describes the making of the polyamides by reaction of an acrylic ester or the like with a polyamide. In this reaction the polyamine removes the alkyl group of the ester and the resulting amide polymerizes, one nitrogen of the polyamine being joined in an amide group, it is considered, and another nitrogen to a carbon of the original vinyl group of the acid.

The polyamides so made are normally syrupy liquids. As such they show the advantages characteristic of liquids in processing and application, as to fibers. Yet they convert, on epoxidation and final curing, to firm but plastic solids.

Briefly stated, the invention comprises the modified polyamides described herein and the process of making them. In the preferred embodiment, the invention comprises modifying the polyamides to resins that retain water solubility but are thermosetting, utilizing this intermediate, as in paper as a binder, and then continuing the modification in situ to a hard resin. In one embodiment, the water soluble polymer intermediate is made in a two stage treatment, as by reacting the polyamides at a high concentration with a small proportion of epichlorohydrin or the like at a moderate temperature and then with additional epichlorohydrin at a more elevated temperature and in a more dilute solution.

The products of the invention are useful especially in making a wet strength paper. Used as a binder for wood fibers in paper, the epoxidized polyamides increase the wet strength of the paper, when tested by the usual standard procedure, to approximately a fourth of the strength of the paper dry. When the polyamide is used in the paper without epoxidation of the polyamide, on the other hand, the wet strength is only approximately 6% of the dry strength.

MODIFYING AGENT

As the modifying agent for complexing and giving the firmness of the new products when cured, there is used any water dispersible epoxidizing agent and preferably the chlorohydrins, e.g., ethylene, propylene, butylene, and styrene chlorohydrins, epichlorohydrin, glycerol mono- and dichlorohydrin, and diglycidyl ethers of ethylene glycol, diethylene glycol, like water soluble glycols, glycerol, pentaerythritol, resorcinol, pyrogallol, catechol, and other such diglycidyl ethers of polyhydric organic compounds having 2–8 carbon atoms to the molecule.

POLYAMIDE

The polyamide to be used in any of the polyamides disclosed in the said copending application. The polyamides made with alkylene polyamides are particularly suitable for the present purpose. They have the following recurring structural unit:

$$-NH-C_nH_{2n}-(NH-C_nH_{2n})_x-NH-\overset{O}{\underset{\|}{C}}-R-$$

in which $n$ and $x$ are integers, $n$ within the range 2–10 and $x$ 0–6, and R is an alkylene group having therein 2–6 carbon atoms. The $C_nH_{2n}$ groups may be replaced by arylene groups.

These polyamides are made suitably by admixing substantially equimolar proportions of an acrylic ester and a polyamine in a polar medium and reacting the mixture at the polymerization temperature, as at $-20°$ to $+40°$ C., in the molar proportion of about 0.2–3 moles of the ester to 1 mole of the polyamine.

After the polymerization reaction is complete, the polymer is purified by stripping off the polar medium and any unreacted materials by partial distillation.

The esters used in making the polyamides are the alkyl and aryl esters of unsaturated monocarboxylic aliphatic acids containing 3–7 carbon atoms and having an ethenoid bond on an alpha-carbon thereof. Examples are the methyl, ethyl, propyl, butyl, phenyl, cresyl, xylyl and benzyl acrylates, methacrylates, ethacrylates and butacrylates. Of these esters, methyl acrylate and methyl methacrylate react rapidly with the polyamine and are preferred. The polyamine employed to react with the ester may be either aromatic or aliphatic, e.g., alkylene polyamines such as the diamines, triamines, tetramines, and pentamines, and more specifically, ethylene, propylene, and butylene diamine; 1,3-diaminobutane; diethylene triamine, triethylene tetramine, tetraethylene pentamine and like amines corresponding to the formula $H_2H-C_nH_{2n}-(NH-C_nH_{2n})_x-NH_2$, $n$ and $x$ being as above; and o-, m-, and p-phenylene diamine, m- and p-tolylene diamine, benzidine, and o-tolidine.

The polyamide resins made from such esters and amides have a viscosity of about 5,000 cps. up to about 300,000 cps.

In a typical procedure for making the polyamide, 172 parts (2 moles) of methyl acrylate were placed in a reactor with 100 parts of water as the polar solvent medium.

Diethylene triamine 234 parts (2.3 moles) in a 70% aqueous solution were added dropwise to the methyl acrylate and water solution at 0°–15° C. with stirring. The mixture was allowed to stand at room temperature overnight and stripped by distillation of the water and of the methanol formed. The aqueous methanol was collected in a Dry Ice-acetone trap at 3 mm. A viscous oil remained. It was the water soluble polyamide, an addition condensation product.

The procedure as set forth immediately above is followed except that ethyl, propyl, butyl, phenyl, cresyl, xylyl, and benzyl acrylate, methacrylate, ethacrylate and butacrylate are substituted, in turn, for the methyl acrylate in equimolar amounts. The reaction is slower in most cases but the corresponding polyamides are formed.

This same procedure is followed except that ethylene, n-proplyene and n-butylene diamine, triethylene tetramine, tetraethylene pentamine, 1,3-diaminobutane, tetramethylene diamine, and decamethylene diamine are substituted, in equimolecular proportions and in turn, for the diethylene triamine. The corresponding polyamides are obtained.

EPOXIDATION

Epoxidation is effected to the stage of forming a water soluble thermosetting resin. The epoxidizing agent is used in the proportion of about 0.5–1.8 moles to 1 of each amine group in the polyamide. When the polyamide used is entirely primary, then there will be one secondary amine group in the said polyamide for each mole of the acid represented in the polymer. When the amine used contains initially a secondary amine group, then there would be this amine group plus another secondary amine group for each monomeric unit in the polymer, i.e., for each mole of the acid represented in the polyamide.

The modifying agent, either the chlorohydrin or the other epoxy compounds is effective in aqueous alkaline solution. The pH at the start must be above 7 and for satisfactory speed of epoxidation within the range 8-13 or slightly higher. The pH establishing agent is ordinarily the residual amine groups in the polyamide which is to be epoxidized. It is not necessary to add any additional alkali such as alkali metal hydroxide or carbonate.

The epoxidation is suitably effected at temperatures from about 10° C. up to refluxing for the mixture, ordinarily about 50°-70° C. The exact temperature chosen will vary in part with the rate of reaction desired, the reaction being faster the higher the temperature.

A special result is obtained, however, when the epoxidation to the water soluble thermosetting resin is effected in two stages. For the first stage there are used a relatively low temperature, e.g. 10°-70° C. and about 25%-75% of the total amount of epoxidizing agent to be used. When this reaction is substantially complete, as shown by strong acceleration of the rate of increase in viscosity, then the reaction mixture is diluted and the remainder of the epoxidizing agent is admixed and the reaction continued with heating, finally to the refluxing temperature, as at about 90°-100° C. This two stage operation is particularly important and helpful when the epoxidizing agent in the second stage is one of the chlorohydrins. The improvement arises not only when both stages use the chlorohydrins but also when the first stage utilizes one of the diglycidyl ethers and the second stage one of the chlorohydrins. During the final heating, in any case, the pH falls to a level substantially below 7 as to 5.5–6. At this stage the heating and the epoxidation are discontinued.

The epoxidized polyamides are useful, without further processing, as strengthening binders in paper making. The aqueous epoxidized polyamide solutions are diluted with water for storage, as by stirring in sufficient water to lower the total solids content of the solution to approximately 10%. Hydrochloric acid is admixed as in amount to lower the pH to around 4-5.

The invention will be further illustrated by description in connection with the following specific examples of the practice of it. In these examples and elsewhere herein proportions are expressed as parts by weight unless specifically stated to the contrary.

*Example 1*

172 parts of methyl acrylate (2.0 moles) and 100 parts of water were placed in a vessel equipped with a mechanical stirrer, thermometer, and condenser. To this was added 234 parts (2.27 moles) of diethylene triamine, over a period of 3 hours at 25°-35° C. Cooling was occasionally necessary. After all the amine was added the reaction mixture was stirred at room temperature for two additional hours. Water and methanol were then distilled away by heating the reaction mixture up to 130° C.

When cooled, the polyamide so made had a viscosity of 130,000 centipoises at 24° C.

To 31.4 parts of the polyamide so made were added 73.1 parts of water. The resulting solution was heated to 50° C. and 36 parts (about 3.6 moles) of epichlorohydrin added over a period of three quarters of an hour. The mixture was then heated to reflux and held there until a pre-gel state was reached, as shown by rapid onset of viscosity. Then 450 parts of water was added to the product and it was cooled to room temperature. The pH of the cooled solution was 4.8.

Whatman No. 1 filter paper was immersed in a 0.5% solution of the resulting polyamide-epichlorohydrin resin for 2 seconds and then soaked in distilled water for 5 minutes. The treated paper was then dried one hour at 105° C. The wet strength retention of this paper was found to be 23% whereas the untreated paper had a wet strength that was only 6% of the same paper dry.

*Example 2*

The procedure and composition of Example 1 are used except that 2.3 moles of any of the other water soluble polyamines disclosed herein are substituted in turn for the diethylene triamine of Example 1 in making the polyamides. The amines so substituted include propylene and butylene diamine; 1,3-diaminobutane; diethylene triamine, triethylene tetramine, tetraethylene pentamine and like amines corresponding to the formula

$n$ and $x$ being as above; and o-, m-, p-phenylene diamine, m- and p-tolylene diamine, benzidine, and o-tolidine.

*Example 3*

The procedure and composition of Example 1 are followed except that the methyl acrylate there used is substituted, in turn, by 2.0 moles of any of the other esters of unsaturated acids shown herein, i.e., by ethyl, propyl, butyl, phenyl, cresyl, xylyl, and benzyl, acrylate, methacrylate, ethacrylate, and butacrylate and methyl methacrylate, ethacrylate, and butacrylate.

*Example 4*

The procedure and composition of Example 1 are followed except that the epichlorohydrin there used is substituted in turn by 3.9 moles of any of the other chlorohydrins or any of the glycidyl ethers disclosed herein, as by ethylene, propylene, butylene, and styrene chlorohydrins, glycerol dichlorohydrin, diglycidyl esters of ethylene glycol, diethylene glycol, like water soluble glycols, glycerol, pentaerythrytol, and other diglycidyl ethers of $C_2$–$C_8$ polyhydric organic compounds, e.g. resorcinol, catechol, and pyrogallol.

*Example 5*

Polyamide resin was made as described in Example 1. The polyamide was then epoxidized in two stages as follows:

Into 31.4 parts of the polyamide there were admixed 73.1 parts of water. The solution so formed was heated to 50° C. Then there were added 18 parts of epichlorohydrin over a period of 45 minutes. The whole was held at about 50° C. until a large increase in viscosity was observed. Water amounting to 41.7 parts was then added and the solution heated again to 50°.

Eighteen parts of additional epichlorohydrin were then admixed and the resulting solution was heated, eventually to refluxing. The refluxing was continued for about an hour and discontinued when the solution reached the pre-gel stage. It was then promptly diluted with water to a solids content of 10%.

The epoxidized polyamides are cured and converted from water soluble to water insoluble condition by heating in acid, neutral, or alkaline condition of the epoxidized polyamide to a temperature of about 60°-130° C. for 3-60 minutes. Temperatures below and above this range may be used, the time being extended at the lower temperatures and shortened at the higher. At 105° C., 5 minutes's heating of a dry film is adequate.

While all of the epoxidized polyamides made as described herein, as in the numbered examples above, are useful as adhesives in paper of the like, the two stage epoxidation product of Example 5 gives greater wet strength after quick curing than shown by a paper made in comparable manner but with the single stage epoxidation resin. When paper containing an epoxidized polyamide resin was cured for only 5 minutes at 105° C., for instance, the wet strength retention was approximately 45% higher when the resin had been epoxidized in the two stage treatment with epichlorohydrin than when the polyamide resin had been epoxidized in the single stage treatment such as described in Example 1.

*Example 6*

A commercial paper is made as follows: Into the aqueous suspension of sulfite wood pulp fibers in a paper beater there are introduced an aqueous solution of 10% concentration of the water soluble, thermosetting epoxidized polyamide resin which is the final product of Example 1, at a pH of about 7.0 and in proportion of 1% of the resin on the weight of the fibers on the dry basis. When the pulp has been beaten and the resin uniformly dispersed in the suspension, the paper stock so produced is formed of matted fiber paper on a Fourdrinier wire and dried by passage over steam heated rollers.

The resin in the paper is then cured by passage through a drying tunnel in which the resin and associated fibers are warmed to about 90°–130° C. for a period of 1 to 10 minutes, the conditions being so chosen, within the ranges stated, to cure the resin to water insoluble form.

The product is a wet strength paper.

All equipment used is conventional and not illustrated.

It will be understood that it is intended to cover all changes and modifications of the examples of the invention herein chosen for the purpose of illustration which do not constitute departures from the spirit and scope of the invention.

We claim:

1. A water soluble thermosetting resin comprising the product of epoxidation, in an aqueous medium at a pH of approximately 8–13, of (*a*) a polyamide of an originally unsaturated monocarboxylic aliphatic acid containing 3–7 carbon atoms, the polyamide containing at least one amine group in the recurring structural unit

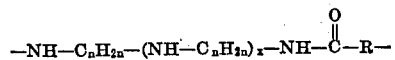

in which $n$ and $x$ are integers, $n$ is within the range 2–10, $x$ is 0–6, and R is a $C_2$–$C_6$ alkylene group by (*b*) a water soluble epoxidizing agent selected from the group consisting of chlorohydrins and diglycidyl ethers of polyhydric organic compounds having 2–6 carbon atoms to the molecule of the said organic compounds and used in the proportion of about 0.5–1.8 moles of the said agent for each amine group in the polyamide.

2. The resin of claim 1, $n$ in the said structural unit being 2.

3. The resin of claim 1, $x$ in the said structural unit being 1.

4. The water soluble thermosetting resinous product of epoxidation of a polyamide of diethylene triamine and methacrylic acid, the epoxidation being effected by epichlorohydrin in the proportion of about 0.5–1.8 moles for 1 mole of the methacrylic acid represented in the polyamide and in an aqueous medium at a pH of approximately 8–13.

5. In making a water soluble thermosetting resin, the process which comprises mixing an aqueous dispersion of an amino group-containing polyamide of a monocarboxylic aliphatic acid having 3–7 carbon atoms to the molecule and an ethenoid bond on the alpha-carbon thereof and an epoxidizing agent selected from the group consisting of chlorohydrins and water soluble diglycidyl ethers of polyhydric organic compounds having 2–6 carbons atoms to the molecule in the proportion of about 0.5–1.8 moles of the said agent for each amino group in the polyamide, warming the resulting solution at a pH of approximately 8–13 until partial reaction of the polyamide and epoxide occurs and discontinuing the warming before the solution gels, the product of epoxidation of the said polyamide remaining in the solution.

6. The process of claim 5, the epoxidizing agent being introduced into the said dispersion in two portions, the first portion corresponding to approximately 25%–75% of the total epoxidizing agent to be used, the mixture including the first portion being maintained at about 10°–70° C. until the reaction that ensues is substantially completed, the second portion of the said agent then being admixed, the mixture that results being heated to a temperature of about 90–100° C. and to the pre-gel stage, and the heating being discontinued before gelling occurs, the product of the reaction of the polyamide and epoxide remaining in solution.

7. A wet strength paper comprising matted paper forming fibers and a binder distributed therebetween and thereover, the said binder being the epoxidized resin of claim 1 in the thermoset condition and in the proportion of about 0.3%–3% of the dry weight of the said fibers.

References Cited in the file of this patent

UNITED STATES PATENTS

| | | |
|---|---|---|
| 2,576,501 | Dalton | Mar. 27, 1951 |
| 2,626,223 | Sattler et al. | Jan. 20, 1953 |